United States Patent
Eguchi et al.

(10) Patent No.: US 7,554,749 B2
(45) Date of Patent: Jun. 30, 2009

(54) VARIABLE POWER OPTICAL SYSTEM AND IMAGE-RECORDING DEVICE

(75) Inventors: Noritoshi Eguchi, Saitama (JP); Tamotsu Nakano, Kanagawa (JP)

(73) Assignee: Sony Corporation (JP)

( * ) Notice: Subject to any disclaimer, the term of this patent is extended or adjusted under 35 U.S.C. 154(b) by 223 days.

(21) Appl. No.: 10/579,210

(22) PCT Filed: Sep. 12, 2005

(86) PCT No.: PCT/JP2005/016725
§ 371 (c)(1),
(2), (4) Date: Feb. 1, 2007

(87) PCT Pub. No.: WO2006/043376
PCT Pub. Date: Apr. 27, 2006

(65) Prior Publication Data
US 2007/0115567 A1  May 24, 2007

(30) Foreign Application Priority Data
Oct. 20, 2004 (JP) .................................. 2004-305437

(51) Int. Cl.
*G02B 15/14* (2006.01)
*G02B 7/02* (2006.01)
*G03B 13/10* (2006.01)

(52) U.S. Cl. ............. 359/694; 359/813; 359/823; 359/698; 396/379

(58) Field of Classification Search ......... 359/694–704, 359/823, 824, 363, 377, 672–675, 684, 689, 359/690, 698, 755; 396/18, 73–75, 84, 87, 396/373, 378, 379, 106; 362/268
See application file for complete search history.

(56) References Cited
U.S. PATENT DOCUMENTS
3,259,039 A  *  7/1966  Okajima .................. 351/206

(Continued)

FOREIGN PATENT DOCUMENTS
JP        62-116911          5/1987

(Continued)

OTHER PUBLICATIONS
Australian Patent Office Examination Report; Application No. SG 200603407-8; Dated: Sep. 12, 2005.

(Continued)

*Primary Examiner*—Loha Ben
(74) *Attorney, Agent, or Firm*—Rader Fishman & Grauer PLLC; Ronald P. Kananen (57) ABSTRACT

A variable power optical system composed of a first optical part (G1) for refraction, a second optical part (G2) for reflection or transmission, and a third optical part (G3) for refraction, with the first optical part being movable with respect to the second and third optical parts to change the focal length of the entire system, wherein the second optical part or the third optical part has a guide 4 which is in contact partly with the first optical part in such a way as to restrict its moving direction and the first optical part is movably held between the second optical part and the third optical part. This structure eliminates the necessity of separately forming the guide to move G1. The guide 4 is formed from a synthetic resin integrally with the stationary optical part (G3).

14 Claims, 11 Drawing Sheets

U.S. PATENT DOCUMENTS

| | | |
|---|---|---|
| 4,708,442 A | 11/1987 | Fujii et al. |
| 5,765,049 A | 6/1998 | Hase et al. |
| 6,288,838 B1 | 9/2001 | Ito |
| 6,515,807 B2 | 2/2003 | Noguchi |
| 7,038,859 B2 * | 5/2006 | Tsuzuki ............... 359/704 |
| 7,085,073 B1 * | 8/2006 | Han et al. ............ 359/698 |

FOREIGN PATENT DOCUMENTS

| | | |
|---|---|---|
| JP | 62-116911 A | 5/1987 |
| JP | 07-020367 A | 1/1995 |
| JP | 11-258678 | 9/1999 |
| JP | 2001-333315 | 11/2001 |
| JP | 2003-222935 | 8/2003 |
| JP | 2004-163751 A | 6/2004 |

OTHER PUBLICATIONS

PCT International Search Report mailed on Dec. 27, 2005.

Notification of Transmittal of Copies of Translation of the International Preliminary Report on Patentability; International Application No. PCT/JP2005/016725; Filing Date: Sep. 12, 2005.

Japanese Office Action issued Feb. 12, 2009 for corresponding Japanese Application No. 2004-305437.

* cited by examiner

VARIABLE POWER OPTICAL SYSTEM AND IMAGE-RECORDING DEVICE

TECHNICAL FIELD

The present invention relates to a variable power optical system and an image-recording device with the variable power optical system. The variable power optical system changes in focal length as its movable optical parts move from one position to another, and the image-recording device has a simplified and miniaturized mechanism.

BACKGROUND ART

There is a recent trend for mobile equipment to be equipped with a small camera module. Attempts are being made to develop a further miniaturized camera module having improved and diversified capabilities.

Such capabilities include a mechanism that changes the focal length as an afocal lens (with an angular magnification smaller than 1) is attached to or detached from the subject side of the image-forming lens. This mechanism is applicable to the built-in camera in the portable telephone or computer or the monitoring camera. An example of the variable power optical system is disclosed in Japanese Patent Laid-open No. Hei-7-20367. It has an afocal system consisting of a negative lens group and a positive lens group that are placed a certain distance apart. The afocal system is held in a lens barrel which has an lateral opening. The afocal system (which is placed in front of the image-forming lens) is moved out of the optical axis as it is turned through 90°. In this state, the lateral opening in the lens barrel functions as a window that permits the image-forming lens to take a photograph by itself.

The camera module to be built into the portable equipment needs improvement in its performance without its mechanism getting complex and large and its power consumption increasing. In other words, the lens system of the camera in the portable telephone or notebook personal computer is restricted in its depth, because the camera has to fit into the thickness of the portable telephone or the thickness of the cover of the personal computer. In addition, the camera that relies on a power supply from the battery needs a means to save power consumption.

DISCLOSURE OF THE INVENTION

Unfortunately, the conventional system presents difficulties in miniaturization and cost reduction because of its lens driving mechanism and lens barrel structure that cannot be simplified.

Any conventional camera module, for example, needs a complex driving mechanism or actuator to switch between the wide-angle lens and the telephotographic lens. However, such a mechanism or actuator is too large to permit the camera module to be built into the recent small mobile equipment. Moreover, the camera module with a complex mechanism is vulnerable to drop impact and hence is unsuitable to the small mobile equipment that needs strength for carrying. Also, the complex mechanism takes a long time for assembling (which increases the production cost) and needs troublesome maintenance and quality assurance.

It is an object of the present invention to provide a new optical system which is capable of changing (or switching) its focal length without any complex mechanism and which is small in size and low in production cost.

The present invention, which was completed to address the above-mentioned problems, is directed to a variable power optical system composed of a first optical part for refraction, a second optical part for reflection or transmission, and a third optical part for refraction, with the first optical part being movable with respect to the second and third optical parts to change the focal length of the entire system, wherein the second optical part or the third optical part has a guide which is in contact partly with the first optical part in such a way as to restrict its moving direction and the first optical part is movably held between the second optical part and the third optical part.

The present invention is directed also to a variable power optical system composed of a movable optical part for refraction and a plastics stationary optical part which functions as a base to support the movable optical part and has a lens formed integrally therewith, with the movable optical part being movable with respect to the stationary optical part to change the focal length of the entire system, wherein the stationary optical part has a guide formed integrally therewith which is in contact partly with the movable optical part in such a way as to restrict its moving direction.

The above-mentioned optical system according to the present invention offers the advantage of eliminating the necessity of separately adding a guide to move the first optical part or the movable optical part. In other words, it is possible to support the first optical part or the movable optical part by utilizing the existing optical part (which is optically essential) if the second or third optical part is provided with the guide for the first optical part or the stationary optical part is formed integrally with the guide for the movable optical part.

The present invention makes it possible to realize the function of controlling and switching the focal length without requiring any complex mechanism to move the first optical part or the movable optical part. This is desirable for miniaturization and cost reduction.

According to a preferred embodiment of the variable power optical system mentioned above, the first optical part has a first lens and a second lens and constitutes, in combination with the second optical part, an afocal system such that the first optical part moves in the direction perpendicular to the optical axis of the first and second lenses over a distance between the position on the optical system of the entire system and the position of retraction from the optical axis of the entire system. This structure saves the space (including the gap between the optical parts) necessary for the first optical part to move, which is desirable for miniaturization. In addition, the variable power optical system mentioned above may be modified such that the light that has passed through the first lens is reflected by the second optical part, with its optical path diverted at right angles, and then passes through the second lens. This structure reduces the depth and makes the optical system adaptable to any equipment with a limited thickness.

To save cost and reduce the number of parts, it is desirable to make the first optical part in one step by integral molding from plastics.

The plastics stationary optical part mentioned above should preferably be formed integrally with the guide for the movable optical part. This effectively simplifies the structure. In addition, preferably, the stationary optical part should preferably have a recess to receive the lens at the opposite side of the guide. The stationary optical part with such a recess functions as a lens holding member. (This eliminates the necessity for providing the lens holding member.)

The variable power optical system according to the present invention may have a movable lens for the light which has passed through the movable optical part and the stationary optical part so that the movable lens together with the lens of the stationary optical part constitute the image-forming optical system and the stationary optical part is provided with a mechanism to drive the movable lens.

This structure determines the optical position of the movable optical part and the movable lens in conformity with the stationary optical part, thereby effectively assuring accuracy.

The variable power optical system according to the present invention may be applied to an image-recording device. In this case it contributes to size reduction despite its additional functions, such as the ability to change the focal length. In addition, it simplifies the mechanism and helps reduce the number of parts and assembling steps, which effectively contributes to quality assurance.

BEST MODE FOR CARRYING OUT THE INVENTION

The present invention may be suitably applied to any equipment which is limited in space inside the enclosure (or which is limited in thickness).

The camera module is becoming larger and larger in size for improved performance and diversified functions, whereas the portable equipment to carry it needs miniaturization. The present invention is designed for a miniaturized, variable power optical system suitable for the camera module with two focal lengths for wide-angle photography and telephotography which is to be mounted on a mobile communications terminal (such as portable telephone) or a mobile information processing terminal (such as portable computer and PDA).

Figure 1:
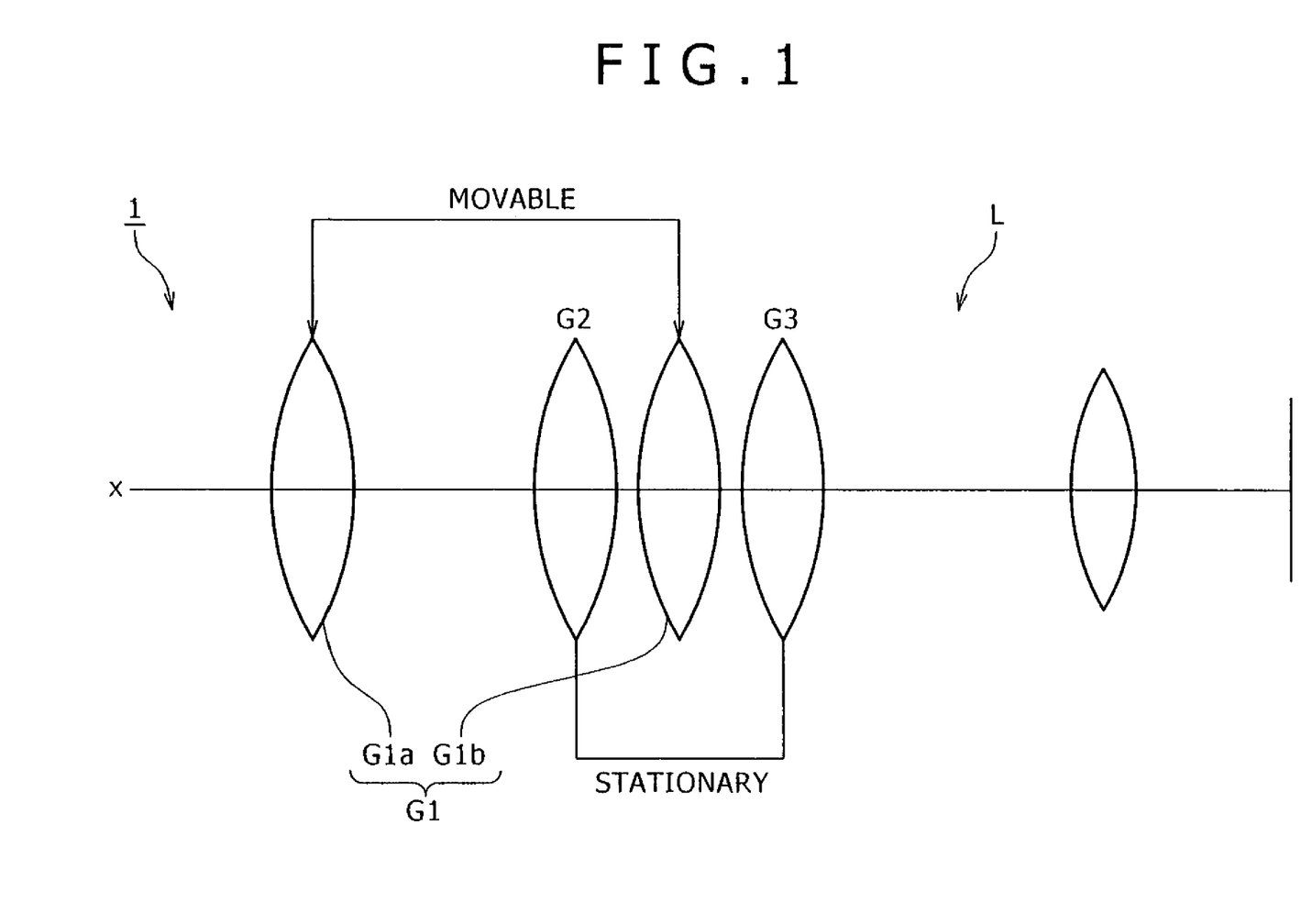
FIG. 1 is a schematic diagram showing the basic structure of the variable power optical system according to the present invention.

FIG. 1 is a schematic diagram showing the basic structure of the variable power optical system according to the present invention.

The variable power optical system 1 has the first optical part "G1" for refraction, the second optical part "G2" for reflection or transmission, and the third optical part "G3" for refraction. It permits G1 to move with respect to G2 and G3, thereby changing the focal length of the entire system continuously or stepwise. Incidentally, an actuator or a manual sliding mechanism may be used to move G1.

In the case where G2 and G3 are stationary optical parts, a conceivable mechanism to move G1 in the direction perpendicular to the optical axis x is a guide which is composed of rods or shafts fixed to the lens barrel (not shown) and extending parallel to each other. The guide members are passed through holes formed in G1, so that they slidably hold G1. This mechanism, however, needs a complex structure as well as a large space, and hence it hinders miniaturization.

In the present invention, this problem is tackled by providing G2 or G3 with a guide which restricts the direction of movement of G1 while remaining in contact with G1$b$ (which is a constituent member of G1). This structure saves the number of parts of the guide and movably supports G1 between G2 and G3. (A detailed description follows.)

It is possible to simplify the structure if G1 is constructed of G1$a$ and G1$b$ and G1$b$ is slidably held between G2 and G3. Incidentally, G1$b$ may be a lens or a transmitting optical part.

The optical system according to the present invention does not need each lens to have a guide for movement of G1. Instead, G1 can be supported by means of the existing optical part.

The following constructions are given for G1.

Incidentally, G1 may be constructed by combining G1$a$ and G1$b$, which have been formed previously and separately, or by integrally forming G1$a$ and G1$b$ from plastics.

Figure 2:
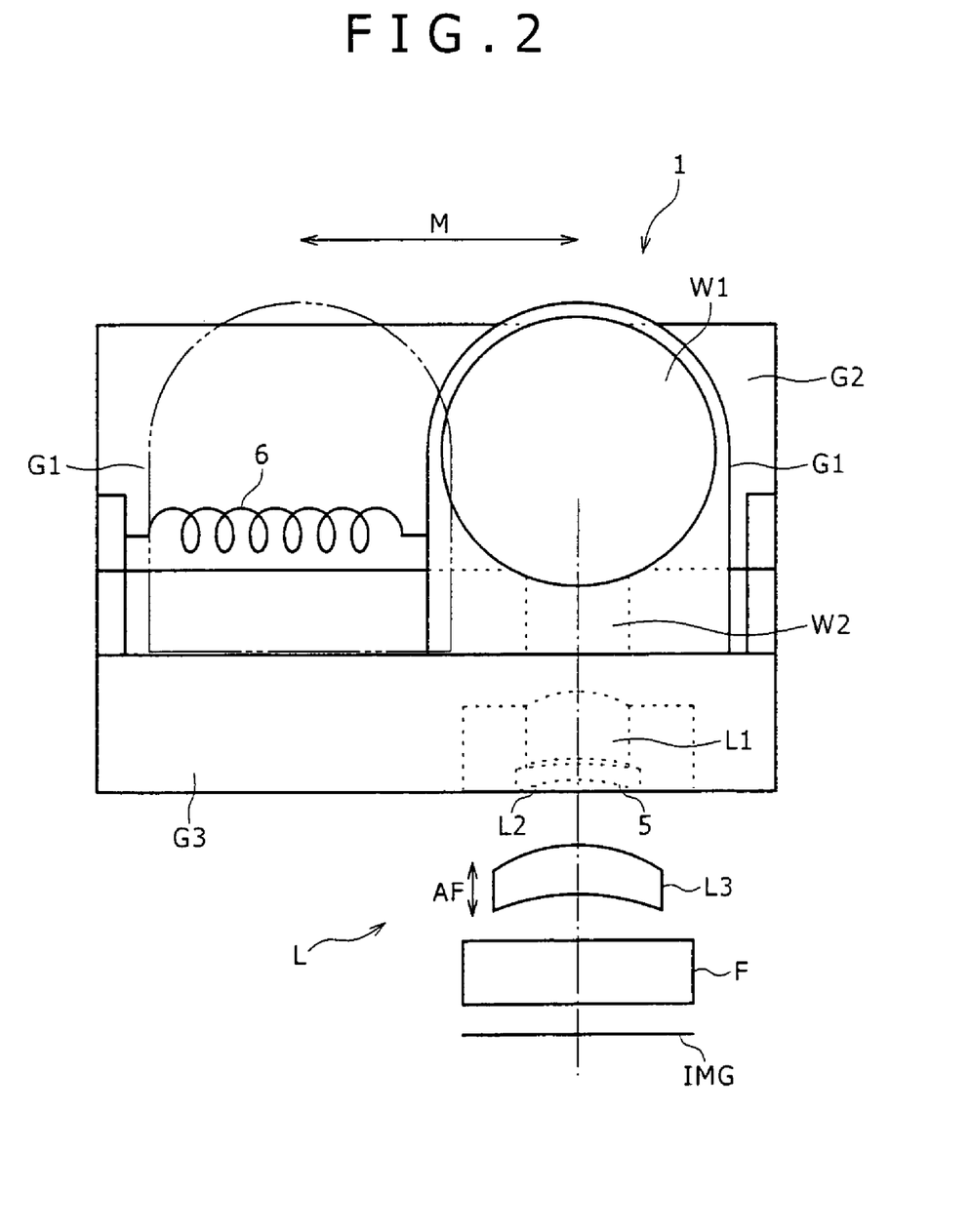
FIG. 2 is a front view of the variable power optical system according to the present invention.
Figure 3:
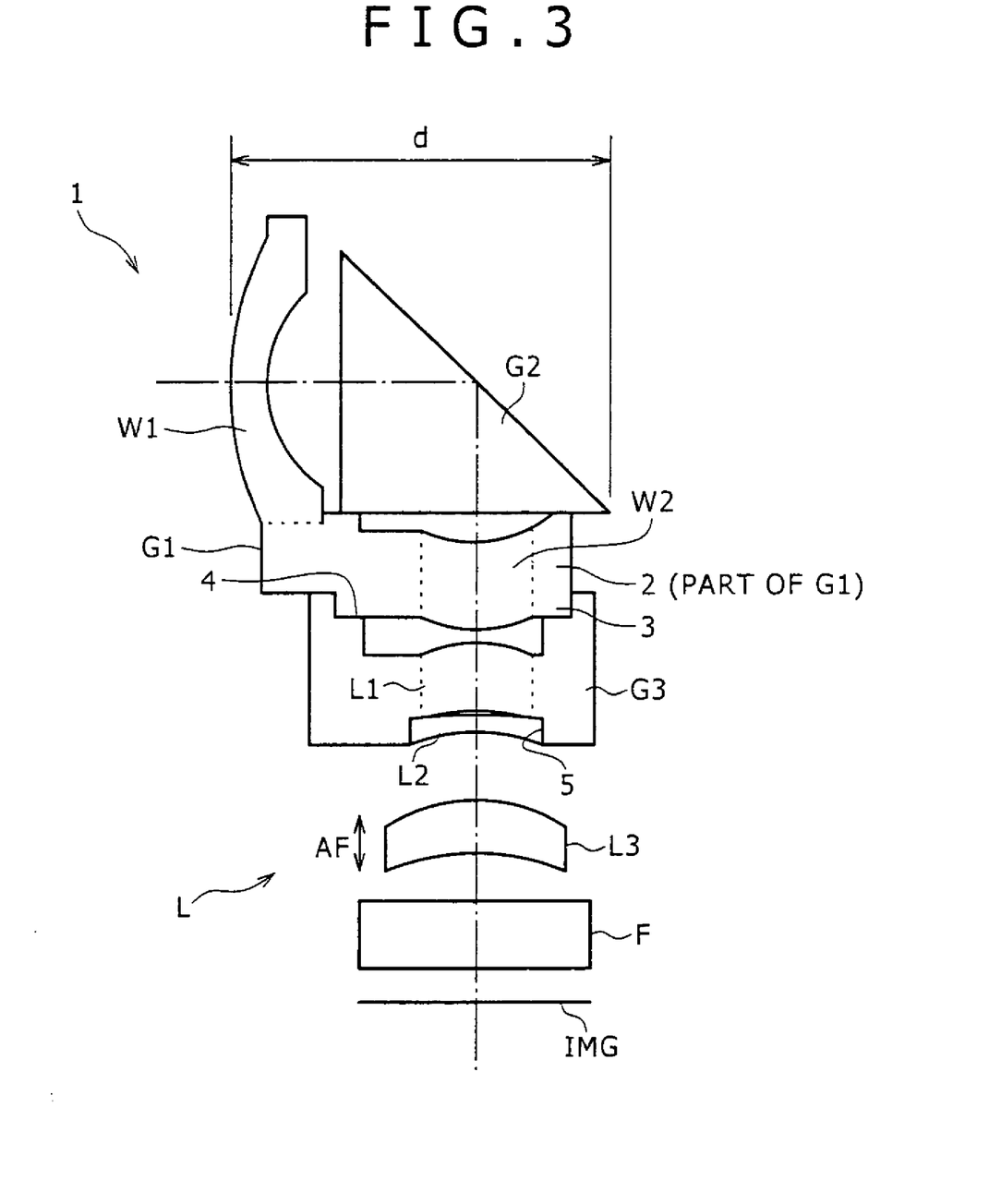
FIG. 3 is a sectional view of the variable power optical system according to the present invention.

FIGS. 2 and 3 are diagrams showing the structure of a video camera module provided with the variable power optical system according to the present invention. This camera module has two switchable focal lengths for wide-angle photography and telephotography.

Both FIG. 2 and FIG. 3 show the structure of the lens for wide-angle photography. FIG. 2 is a front view, and FIG. 3 is a sectional view.

The first optical part G1 has a first lens W1 (with negative refracting power) and a second lend W2 (with positive refracting power), both of which are single lenses in this example. (Single lenses are preferable for simple structure with a minimum number of parts, although compound lenses are also acceptable.) Preferably, W1 should be a concave meniscus lens, with its strong concave surface facing the subject, and W2 should be a convex lens. (The combination of W1 and W2 mentioned above is suitable for a simple, small afocal system. At least one surface of these lenses preferably should be aspherical for aberration correaction in the afocal system.)

Preferably, G1 should be a single part molded from transparent plastics for cost saving and parts reduction, so that it can be molded in one step. G1 in this example has an L-shaped cross section, so that W1 and W2 have optical axes crossing each other at right angles.

Figure 4:
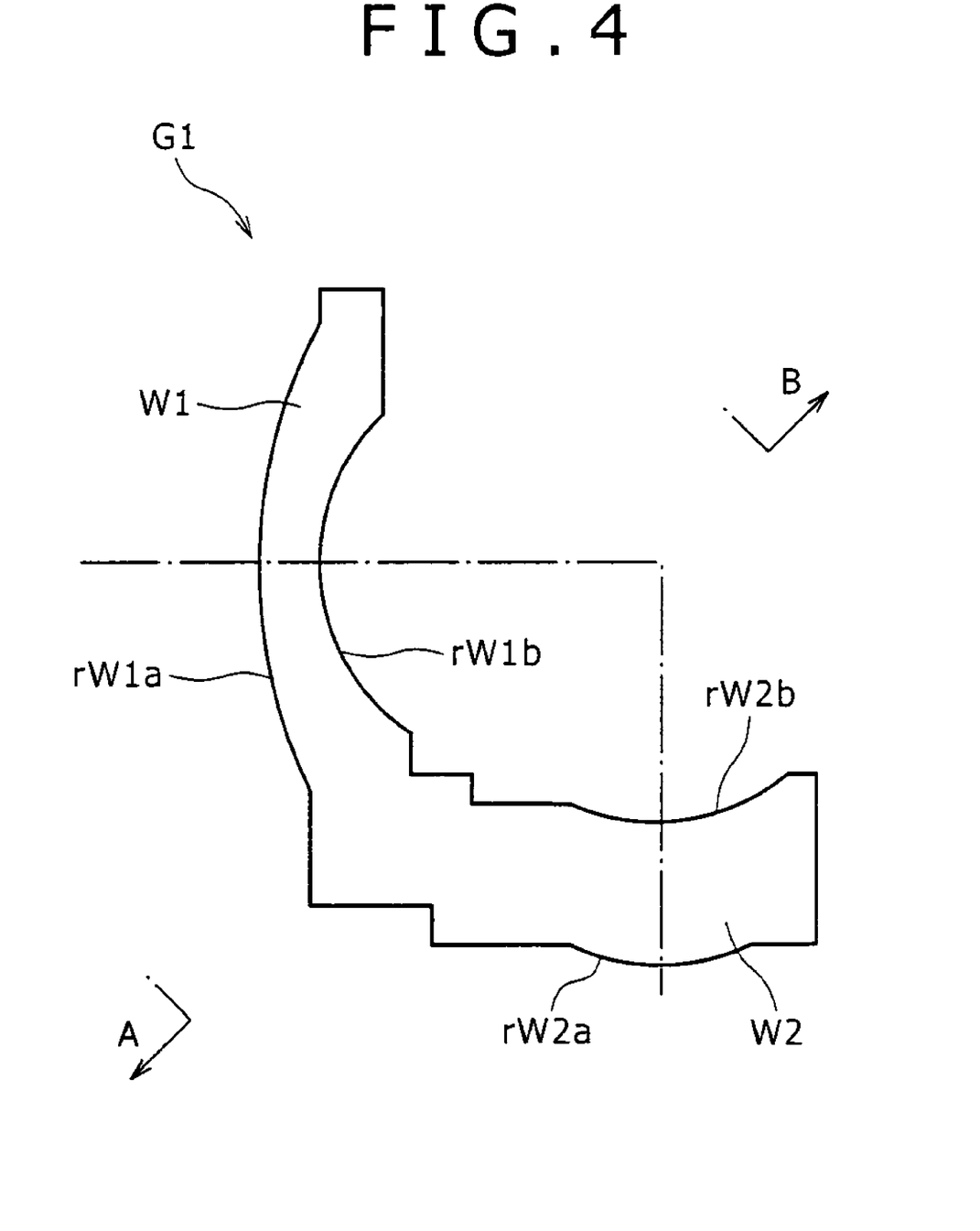
FIG. 4 is a sectional view of the optical part G1.

FIG. 4 is a sectional view of the optical part G1 consisting of W1 and W2 which are integrally molded from plastics.

The molding of plastic lenses usually employs a mold which opens in the direction of the optical axis at the time of demolding. However, the molding of the complex lens shown in FIG. 4 employs a mold which opens in the directions indicated by arrows A and B (at an angle of about 45° with respect to the optical axes of W1 and W2) at the time of demolding.

In FIG. 4, rW1$a$ and rW1$b$ denote respectively the incident surface and the emergent surface of the first lens W1.

Also, in FIG. 4, rW2$a$ and rW2$b$ denote respectively the emergent surface and the incident surface of the second lens W2.

The surfaces rW1$a$ and rW2$a$ are formed by a mold which opens in the direction of arrow A. The surfaces rW1$b$ and rW2$b$ are formed by a mold which opens in the direction of arrow B. To ensure good demolding, the periphery of the lens should be free of undercuts which prevent the mold from opening smoothly in the directions of arrows A and B.

Figure 5:
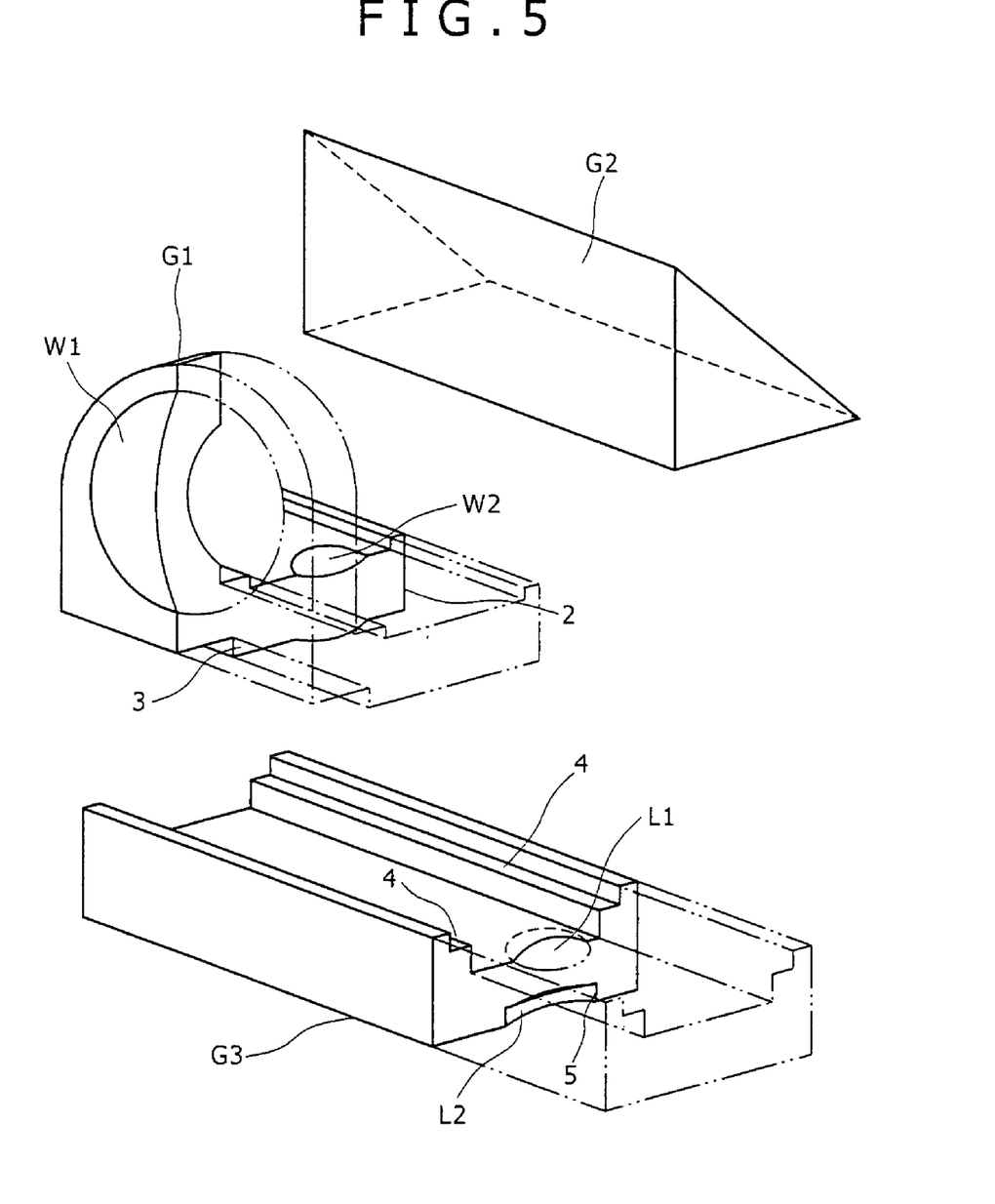
FIG. 5 is an exploded perspective view, with constituent parts partially cut away.

FIG. 5 shows the shapes of G1, G2, and G3 in perspective.

The second optical part G2 is a stationary mirror or prism to bend the optical path by reflection. G2 in combination with G1 constitutes an afocal system. G2 may be a right-angle prism of glass having a high refractive index.

This helps miniaturize the afocal system because the principal ray inclines less toward the optical axis in the prism.

The third optical part G3 functions as a base to support G1. It is a stationary plastics optical part in which the lens L1 is integrally formed.

The part 2 of G1, in which W2 (corresponding to G1b mentioned above) is formed, is held between G2 and G3. G1 is held by G3 such that it moves in the direction of arrow M in FIG. 2. In other words, the part 3 (facing G3) of the part 2 is in contact with the rail-like guide 4 formed on G3, and the part 3 is in contact with G2. Incidentally, the guide 4 is formed on G3 for easy fabrication in this example; however, it also is possible to form the guide on G2.

The direction of movement of G1 (as a movable optical part) is restricted by the guide 4 of G3, so that G1 is made to move in the direction perpendicular to the optical axis of W1 and W2. To be more precise, G1 moves between one position (indicated by a solid line in FIG. 2) and the other position (indicated by a chain line in FIG. 2). The first position (for wide-angle photography) coincides with the optical axis of the entire system) and the second position (for telephotography) is away from the optical axis of the entire system. This structure saves space for the movement of G1 and hence is desirable for miniaturization.

Preferably, G3 should be made of clear synthetic resin, so that the guide 4 is integrally formed. G3 has a recess 5 (to receive the lens L2) in the opposite side of the guide 4, so that L2 is fitted into and fixed to the recess. Thus, G3 functions not only as a base for G1 but also as a lens holding member.

The light which has passed through W1 is reflected by the oblique plane of G2 and diverted at right angles, so that it passes through W2, L1, and L2.

The light which has passed through G1, G2, and G3 passes through the movable lens L3 for autofocusing (AF). (Incidentally, G3 has a mechanism to guide and drive L3 as mentioned later.) L3 together with L1 and L2 constitute the image-forming optical system L.

The image-forming optical system L is not specifically restricted as long as it has an angle of view slightly smaller than the standard lens and is comprised of lenses that permit easy aberration correction for the diaphragm placed in front of them. For example, it may be comprised of tree lenses constituting three lens groups as shown in FIG. 3. The first lens is a convex lens L1 (having an aspherical surface), with its convex surface facing the subject. The second lens is a concave meniscus lens L2, with its concave surface facing the image. The third lens is a convex lens L3. This optical system is simple in structure and yet is miniaturized to such an extent that the overall length from the side facing the subject to the image is approximately equal to the focal length. In addition, with W1 and W2 (as the wide conversion lens) attached for wide-angle photography, it has a negative Petzval sum, but without W1 and W2, it has an adequate positive Petzval sum. This effectively prevents the curvature of field from fluctuating as the focal length is switched.

The light which has passed through the image-forming system L then passes through the filter F and reaches the image forming plane IMG, where there is arranged a solid imaging device, such as a CCD (Charge Coupled Device) and a CMOS (Complementary Metal Oxide Semiconductor).

The above-mentioned G1, G3, and L3 may be made of clear plastics such as acrylic resin, polycarbonate, and polyolefin, which cost less and permit easy design. Of these plastics, cyclo-olefin polymer ("ZEONEX" from Zeon Corporation) is desirable because of its good optical properties and machinability. It permits an aspherical surface for aberration correction to be formed thereon easily. The prism G2 is made of glass, and the lens L2 (which is held in the recess 5 of G3) also is made of glass.

Figure 6A:
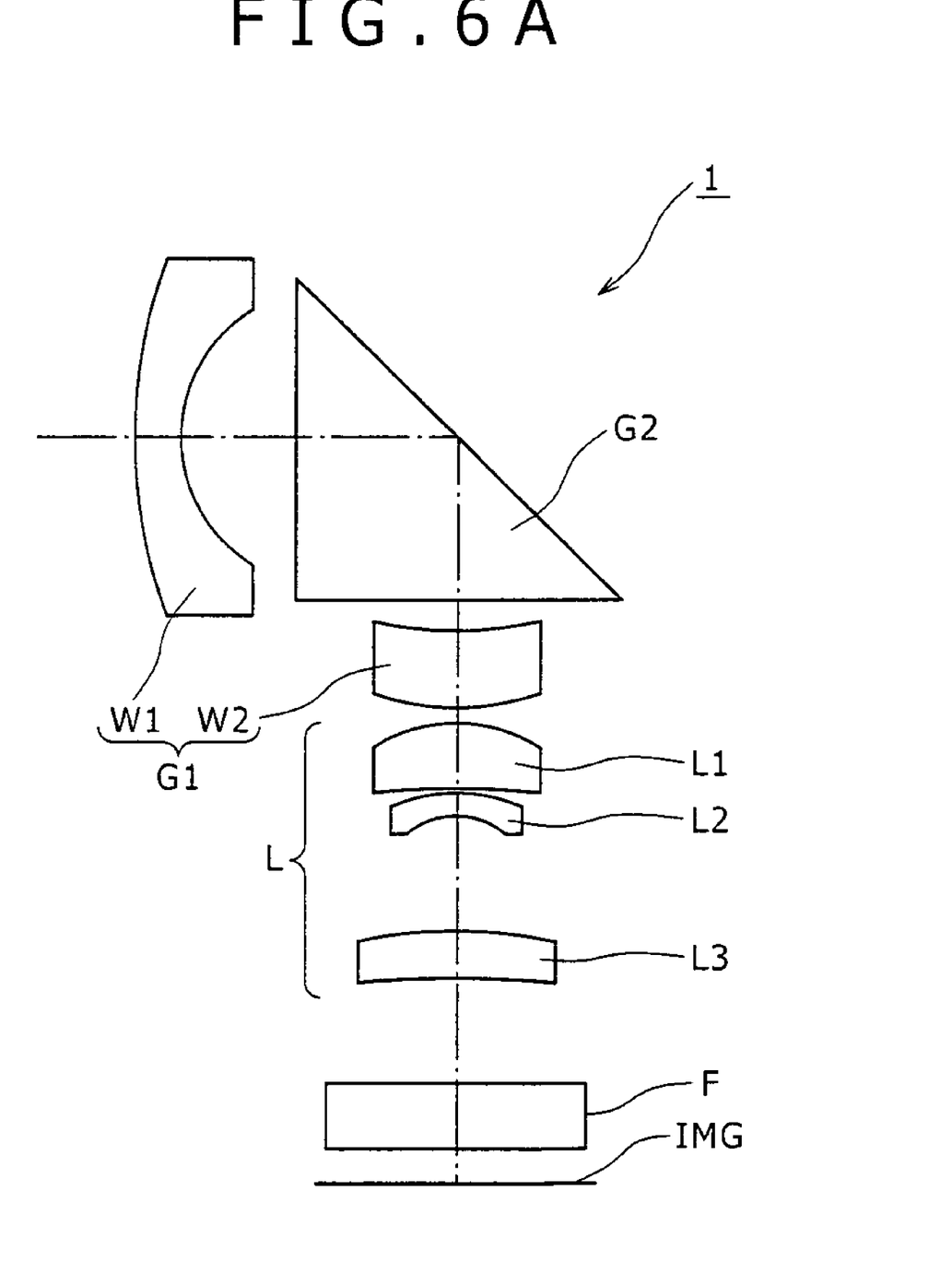
FIG. 6A is a diagram showing the arrangement of lenses for wide-angle photography and telephotography.

FIG. 6(a) shows the lens arrangement for wide-angle photography.

The lenses and prism are arranged in the order of W1, G2, W2, and L (starting from the object side). The first three members constitute the afocal system producing an angle magnification smaller than 1. The light which has passed through W1 is reflected by the reflecting surface of the prism for a 90° diversion. Then it passes through W2, L (image-forming optical system), and F (filter) to reach the receiving surface of the imaging device.

Figure 6B:
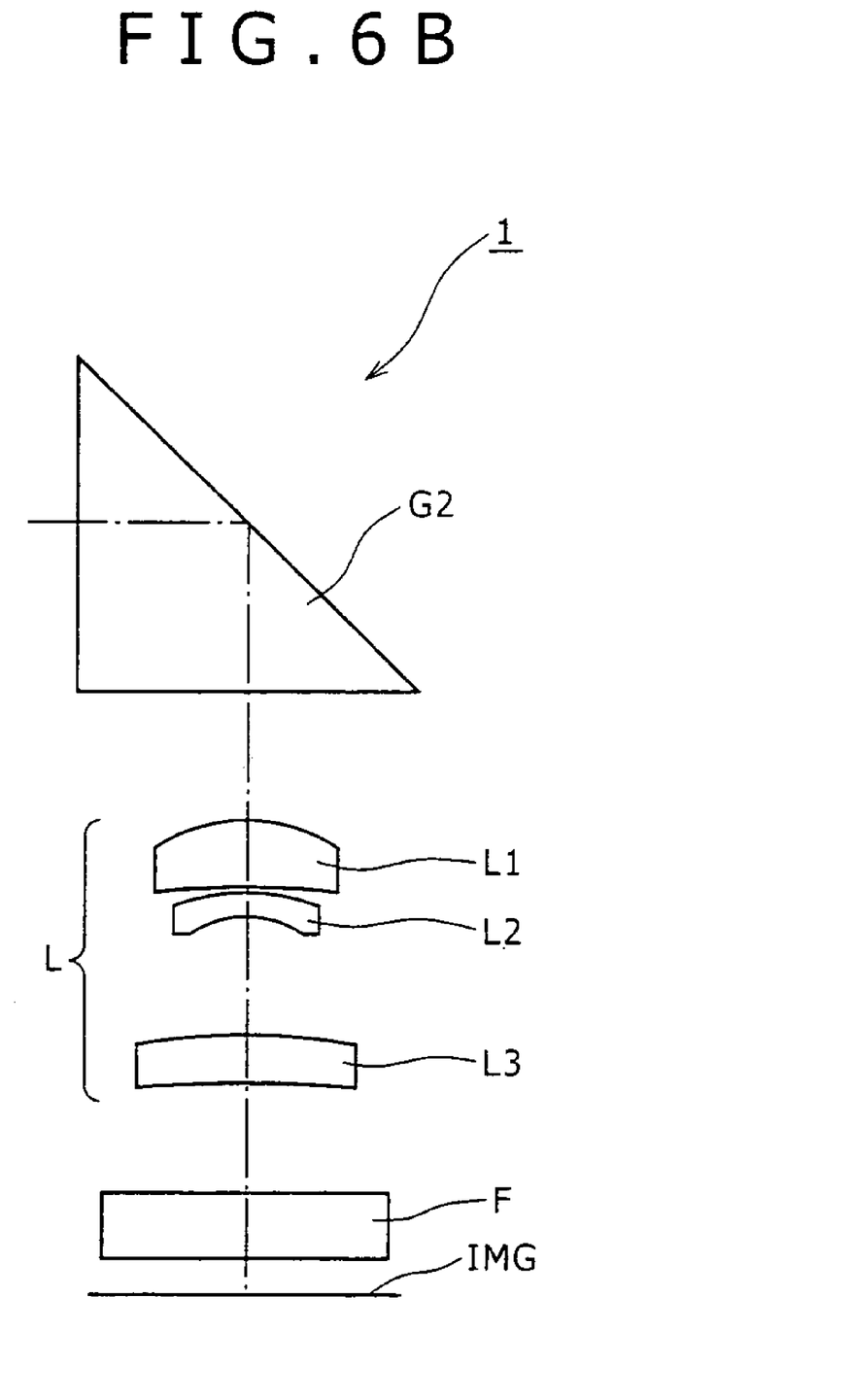
FIG. 6B is a diagram showing the arrangement of lenses for wide-angle photography and telephotography.

FIG. 6(b) shows the lens arrangement for telephotography.

This lens arrangement results after W1 and W2 have moved in the direction perpendicular to the optical axis of the entire system (or in the direction perpendicular to the paper) and retreated to the position away from the light path of the image-forming optical system L. The light incident on G2 is deflected through 90°, and the deflected light reaches the receiving surface of the imaging device through the image-forming optical system L and filter F.

Thus, the variable power optical system according to the present invention is constructed such that the focal length of the entire system varies, with the angle magnification remaining smaller than 1, as G1 moves between two positions, one where W1 and W2 are on the optical axis of the entire system and the other where W1 and W2 are away from the optical axis of the entire system.

Moreover, the variable power optical system according to the present invention has a reduced depth (in the direction of the optical axis of W1) owing to the stationary optical part (G2) which deflects the optical path between W1 and W2. (The depth is indicated by "d" in FIG. 3.) The reduced depth permits the optical system to be adapted to a mobile phone with limited dimensions.

The variable power optical system according to the present invention is constructed such that W1 and W2 move in the direction approximately perpendicular to their optical axis. This structure saves the space for movement of W1 and W2 more than the structure which is designed to turn the lens barrel, and hence it is small in size and readily adaptable to a mobile phone with limited dimensions.

Modes of the moving means of G1 include the following.

A mode in which a manual mechanism is used; and

A mode in which an actuator is used.

The manual mechanism may be comprised of an energizing means (such as elastic body and magnet) that keeps G1 at the position for wide-angle photography and a locking means that keeps G1 at the position for telephotography when a knob or lever attached to G1 is operated to retreat G1. When the lock is released, G1 returns to the position for wide-angle photography. The manual mechanism needs no electric power and hence is suitable for any equipment that requires an energy savings and also is suitable for the simple and miniaturized mechanism.

The actuator may employ an elastic member 6 of a shape-memory alloy (which is schematically represented by a spring in FIG. 2), so that the elastic member extends or contracts as it is electrically energized, thereby moving G1. The elastic member 6 has its one end attached to G1 and the other end fixed. It keeps G1 at the position for wide-angle photography and moves (retreats) to the position for telephotography as it contracts upon electrification. The actuator also may employ an electromagnetic mechanism for attraction and repulsion or a gear mechanism driven by a power unit. Any complex mechanism should be avoided.

In the case where G2 is a prism or mirror, G1 can be supported by means of an optically necessary part. However, the present invention may be applied to any system which does not use a prism or mirror. For example, G1 may be comprised of W1 and W2 that are placed a certain distance apart and hence assume a U-shaped cross section. In this case, G1 is partly held between a transparent member (corresponding to G2) and G3 so that it is movable. (The transparent member may be integrally formed with G3, so that G1 can be supported by a single part.) The above-mentioned mechanism may be modified such that G1 itself is replaced by any one of interchangeable parts according to need instead of providing the means to move G1. In this case, G1 is partly held between G2 and G3 so that it functions as an interchangeable lens.

EXAMPLES

FIGS. 7 to 11 show an example of the portable equipment (such as mobile phone) to which the present invention is applied.

Figure 7:
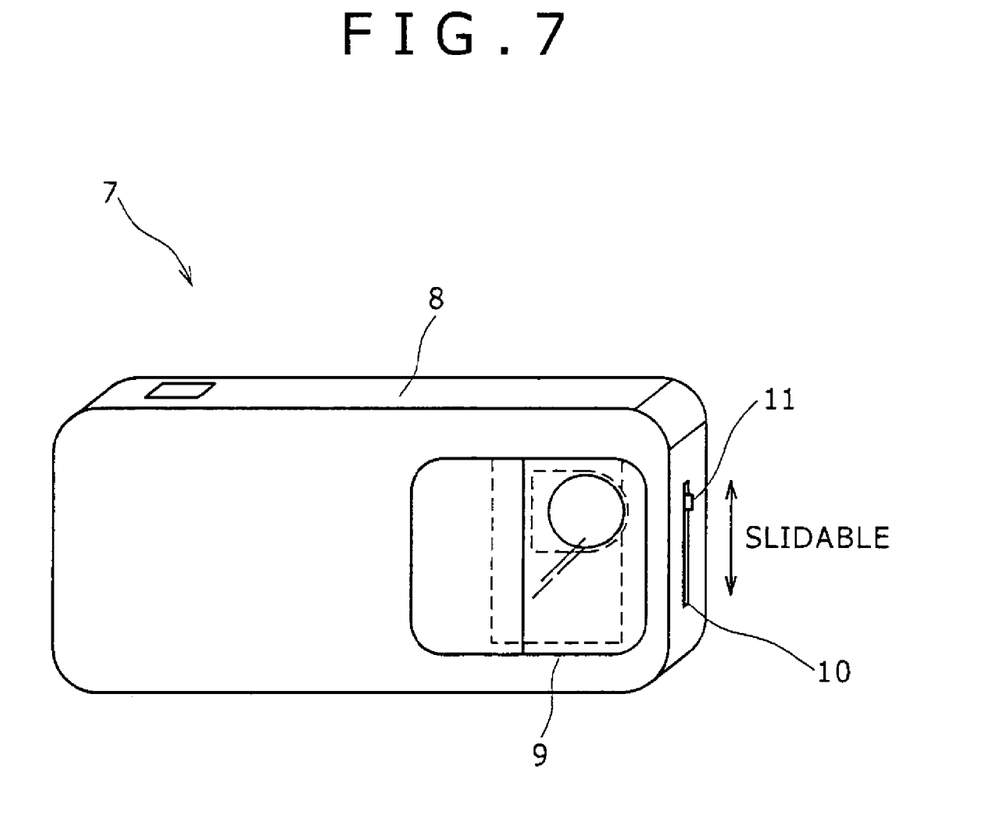
FIG. 7 is an external view showing one example of the present invention.

FIG. 7 shows the external appearance of the image-recording device 7, which is comprised of the main body 8 and the camera module 9 mounted thereon.

The main body 8 has a slot 10 formed in its side wall. Projecting through the slot 10 is a slidable knob 11 to move the movable optical part corresponding to G1 mentioned above manually. The camera module 9 has the same optical constitution as mentioned above. That is, it is comprised of the first lens W1, the optical part G2 to divert the optical path, the second lens W2, and the image-forming optical system L (having a field angle of about 32°), with the first three components constituting an afocal system having an angle magnification of 0.5.

Figure 8:
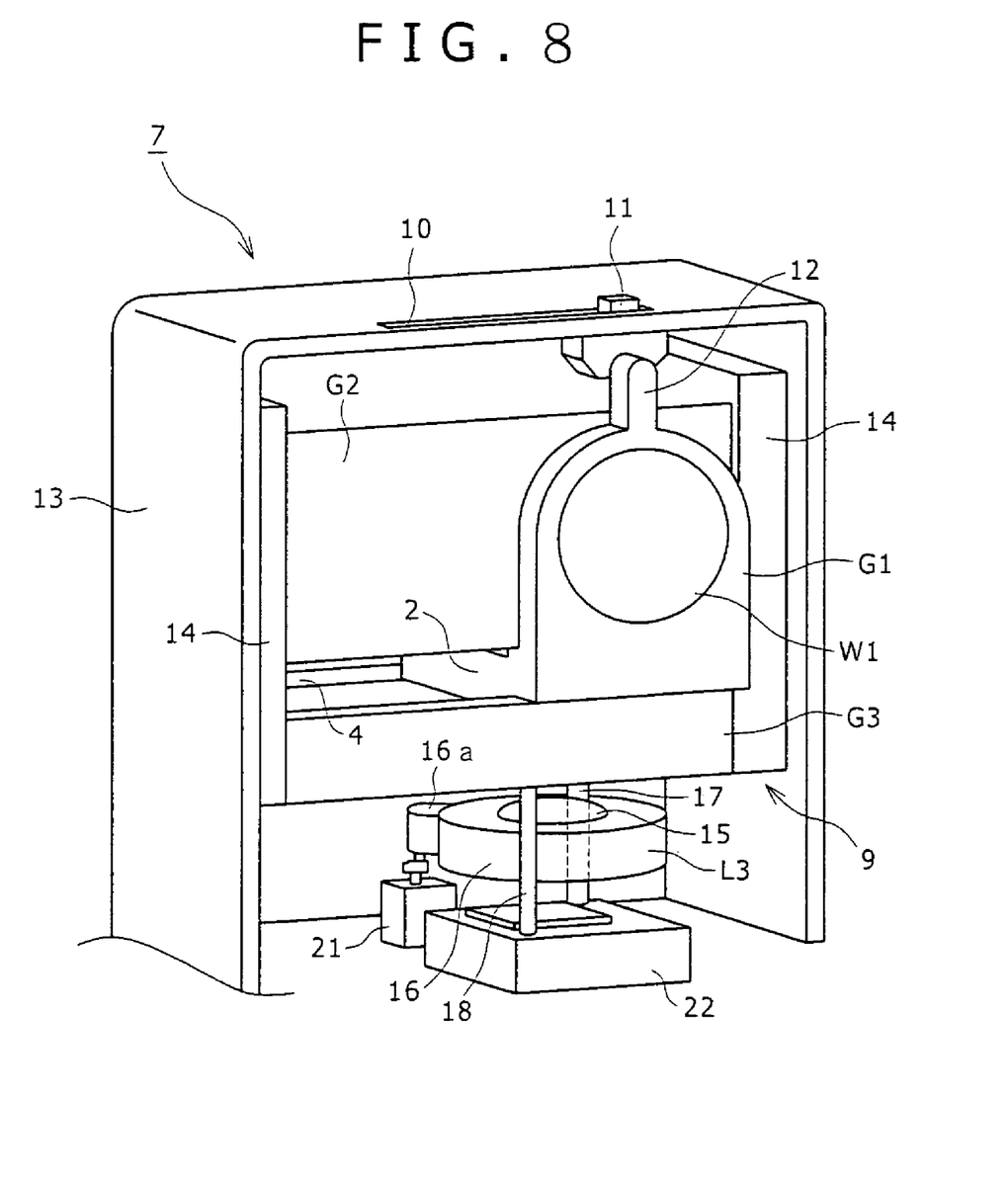
FIG. 8 is a perspective view showing important parts of one example of the present invention.

FIG. 8 is a perspective view showing the important parts of the image-recording device 7 arranged for wide-angle photography.

The optical part G1 has a projection 12, to which a knob 11 is fixed. The knob 11 projects from the casing 13 of the main body 8, with its part passing through the slot 10.

The optical part G2 is a triangular prism. Between the prism and G3, part of G1 is slidably held. In other words, G3 has the guide 4 (guide rail), and the part 2 of G1 comes into contact with the guide 4. As the knob 11 is slid along the slot 10, G1 is moved in the prescribed direction, for example, it is moved from the position for wide-angle photography (as shown) to the position for telephotography.

The ends of G2 (prism) and G3 are fixed to the side plates 14 and 14, which are fixed to the casing 13.

The movable lens L3, as a constituent of the image-forming optical system L, is comprised of the lens 15 and the frame 16, which are molded integrally (to save the number of parts and assembling steps). The frame 16 is movably supported by the shafts 17 and 18 so that it moves along the optical axis.

Figure 9:
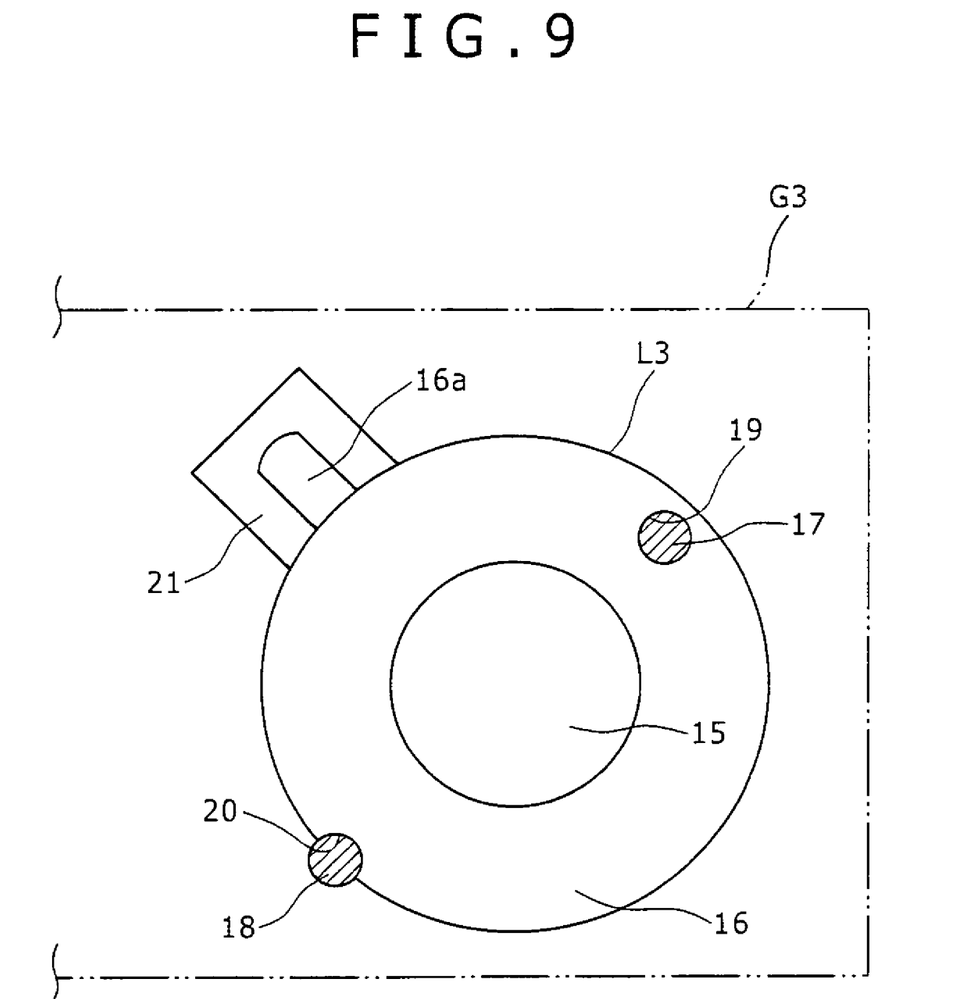
FIG. 9 is a diagram illustrating the movable lens L3 and its guide mechanism.

The guiding shafts 17 and 18, which extend along the optical axis from the optical part G3, are connected to the imaging device 22 (mentioned later). FIG. 9 is a schematic sectional view showing the frame 16 and the shafts 17 and 18. The frame 16 for the movable lens L3 has a hole 19 and a notch 20, which are symmetrically arranged with respect to the lens center. The shaft 17 passes through the hole 19, and the shaft 18 fits into the notch 20. The frame 16 also has a projection 16a, which is driven by an actuator 21 so that the movable lens L3 moves along the shafts 17 and 18.

The above-mentioned structure permits G3 (as the stationary optical part) to be provided with a mechanism (and guide) to drive the movable lens L3. This mechanism determines the accuracy of the lens system (including L3, L2, and L1) and hence contributes to the accuracy of assembling. It follows, therefore, that the optical positions of W2, L1, L2, and L3 are determined by a single stationary optical part, and this is desirable for the assurance of accuracy.

The imaging device 22 is placed at the image-forming plane of the image-forming optical system L. It transmits its output signals to the camera signal processing unit (not shown).

Figure 10:
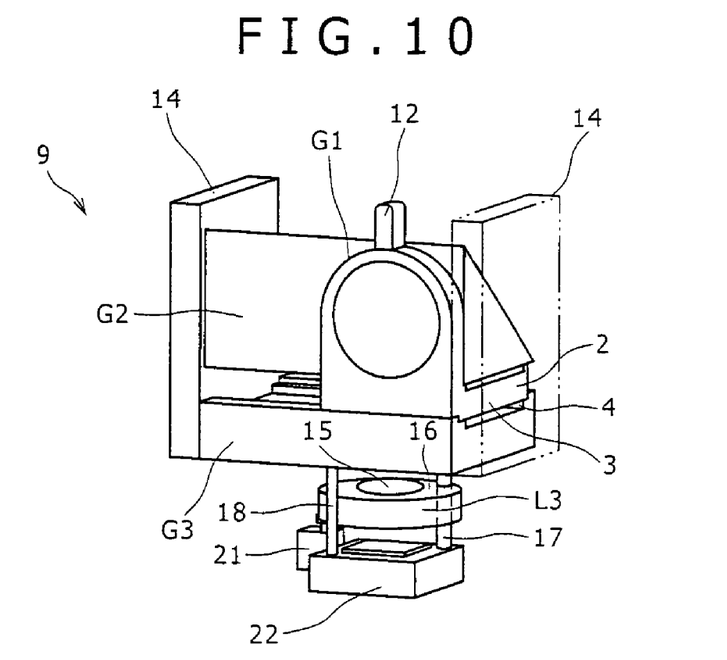
FIG. 10 is a perspective view showing important parts of the optical system arranged for wide-angle photography.
Figure 11:
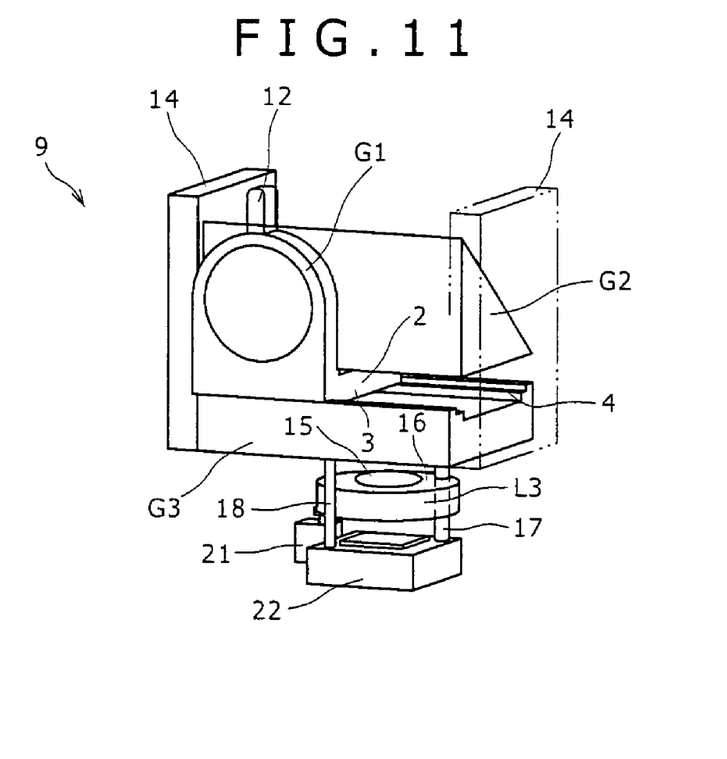
FIG. 11 is a perspective view showing important parts of the optical system arranged for telephotography.

FIGS. 10 and 11 are perspective views showing the important parts of G1, G2, G3, L3 and the imaging device 22. In FIG. 10, G1 is positioned for wide-angle photography (with a focal length of 35 mm, for example), and in FIG. 11, G1 is positioned for telephotography (with a focal length of 70 mm, for example).

In the case shown in FIG. 10, G1 is moved to one end (right side) of the space between G2 and G3, so that the entire system is comprised of W1, G2, W3, and L, the former three constituting the afocal system and the last one constituting the image-forming optical system.

In the case shown in FIG. 11, G1 is moved to the other end (left side) of the space between G2 and G3, so that the entire system is comprised of G2 and L.

The above-mentioned structure may be applied to a mobile phone with a built-in camera, which is comprised of the following components.

CPU (Central Processing Unit) and system controller.

ROM (Read Only Memory), RAM (Random Access Memory), and auxiliary memory.

Liquid crystal display and its controller.

Cameral module and its controller.

Voice signal processing unit.

Communications processing unit.

The above-mentioned constituents are connected to one another through buses. For example, the control unit of the camera module sends control signals to the actuator 21 to drive the movable lens L3. The camera module may be equipped with a sensor to detect the position of the optical part G1 or the knob 11, so that the control unit of the camera module knows whether G1 is positioned for wide-angle photography or telephotography.

The control unit of the camera module performs image data compression on the static images and dynamic images obtained by the variable power optical system and imaging device, thereby converting them into data in the format of JPEG (Joint Photographic coding Experts Group) or MPEG (Moving Picture Experts Group). The compressed image data is stored temporarily in RAM and then transferred to a recording medium (such as memory card) for image data storage or displayed on the monitor on the main body.

The camera may also record voice data through the microphone in synchronism with photographing, and the recorded voice data is sent to the data recording unit or speaker through the voice processing unit (audio codec).

The image and voice data may be transmitted, according to need, to the external information equipment by infrared rays or through wireless communications interface. The communications control unit transmits and receives radio waves to and from the radio station through the antenna.

Owing to its reduced depth, the camera module with the variable power optical system according to the present invention can be mounted easily on any equipment, such as a mobile phone, which is limited in size.

The above-mentioned structure offers the following advantages.

It can be applied to an optical system which needs the switching of focal length for wide-angle photography, telephotography, or close-up photography without requiring any complex mechanism, with the optical system remaining small in size.

It permits the optical part (which is essential in the optical system) to function as a support for the lens and the lens moving mechanism, thereby eliminating the necessity of adding a guide or the like. This effectively simplifies the mechanisms and reduces the number of parts.

Needing no actuator or power source to change the focal length, it is simple in structure and suitable for small mobile equipment with less power consumption.

The invention claimed is:

1. A variable power optical system composed of a first optical part for refraction, a second optical part for reflection or transmission, and a third optical part for refraction, with the first optical part being movable with respect to the second and third optical parts to change a focal length of the optical system, wherein the second optical part or the third optical part has a guide which is in contact partly with the first optical part in such a way as to restrict its moving direction and the first optical part is movably held between the second optical part and the third optical part.

2. The variable power optical system according to claim 1, wherein the first optical part has a first lens and a second lens and constitutes, in combination with the second optical part, an afocal system such that the first optical part moves in the direction perpendicular to the optical axis of the first and second lenses over a distance between the position on the optical system and the position of retraction from the optical axis of the optical system.

3. The variable power optical system according to claim 2, wherein the light that has passed through the first lens is reflected by the second optical part, with its optical path diverted at right angles, and then passes through the second lens.

4. The variable power optical system according to claim 1, wherein the first optical part is a molded product formed from a plastics material.

5. A variable power optical system composed of a movable optical part for refraction and a plastics stationary optical part which functions as a base to support the movable optical part and has a lens formed integrally therewith, with the movable optical part being movable with respect to the stationary optical part to change a focal length of the optical system, wherein the stationary optical part has a guide formed integrally therewith which is in contact partly with the movable optical part in such a way as to restrict its moving direction.

6. The variable power optical system according to claim 5, wherein the stationary optical part has a recess to receive a lens on the opposite side of the guide.

7. The variable power optical system according to claim 5, which has a movable lens for the light which has passed through the movable optical part and the stationary optical part so that the movable lens together with the lens of the stationary optical part constitute an image-forming optical system and the stationary optical part is provided with a mechanism to drive the movable lens.

8. An image-recording device comprising an image-forming optical system and an imaging device placed at a focal plane with the image-forming optical system being constructed such that one optical part is moved to change a focal length of the image-forming optical system, wherein the image-forming optical system comprises a first optical part for refraction a the one optical part, a second optical part for reflection or transmission, and a third optical part for refraction, wherein the second optical part or the third optical part has a guide which is in contact partly with the first optical part in such a way as to restrict its moving direction and the first optical part is movably held between the second optical part and the third optical part.

9. The image-recording device according to claim 8, wherein the first optical part has a first lens and a second lens and constitutes, in combination with the second optical part, an a focal system such that the first optical part moves in the direction perpendicular to the optical axis of the first and second lenses over a distance between the position on the image-forming optical system and the position of retraction from the optical axis of the image-forming optical system.

10. The image-recording device according to claim 9, which is constructed such that light that has passed through the first lens is reflected by the second optical part, with its optical path diverted at right angles, and then passes through the second lens.

11. The image-recording device according to claim 8, wherein the first optical part is a molded product formed from a plastics material.

12. An image-recording device which has an image-forming optical system and an imaging device placed at a focal plane and which is constructed such that one optical part of a plurality of optical parts is moved to change a focal length of the image-forming optical system, which has a variable power optical system composed of a movable optical part for refraction as the one optical part and a plastics stationary optical part as another one of the plurality of optical parts which functions as a base to support the movable optical part and has a lens assembly formed integrally therewith, wherein the stationary optical part has a guide formed integrally therewith which is in contact partly with the movable optical part in such a way as to restrict its moving direction.

13. The image-recording device according to claim 12, wherein the stationary optical part has a recess to receive a lens on the opposite side of the guide.

14. The image-recording device according to claim 12, which has a movable lens for the light which has passed through the movable optical part and the stationary optical part so that the movable lens together with the lens of the stationary optical part constitute an image-forming optical system and the stationary optical part is provided with a mechanism to drive the movable lens.

* * * * *